United States Patent Office 3,110,641
Patented Nov. 12, 1963

---

3,110,641
MELAMINE PERCHLORATE AS A PROPELLANT INGREDIENT
John A. Gallaghan, Ben Lomond, Calif., assignor to the United States of America as represented by the Secretary of the Navy
No Drawing. Filed Apr. 25, 1960, Ser. No. 24,632
2 Claims. (Cl. 149—98)
(Granted under Title 35, U.S. Code (1952), sec. 266)

The invention described herein may be manufactured and used by or for the Government of the United States of America for governmental purposes without the payment of any royalties thereon or therefor.

This invention relates to propellants and to a new propellant ingredient.

Nitroguanadine has frequently been used in the past as an ingredient in nitrocellulose-base propellants to lend exceptional stability. Nitroguanadine is costly, however, and possesses poor ignitability.

It is therefore an object of this invention to provide a new composition of matter and a method of preparing same.

Another object is to provide an ingredient to replace nitroguanadine in exceptionally stable nitrocellulose-base propellants.

Other objects and many of the attendant advantages of this invention will be readily appreciated as the same becomes better understood by reference to the following detailed description.

The foregoing objects are accomplished by first preparing melamine perchlorate, grinding it to the size desired, and incorporating it in solid propellants which are processed in the usual manner.

Melamine perchlorate is prepared by suspending melamine in water, adding perchloric acid slowly with agitation. Then the suspension is warmed until the melamine perchlorate is dissolved and then filtered. On cooling the filtrate, melamine perchlorate crystallizes out.

Melamine perchlorate prepared according to the preceding paragraph is ground up by any convenient method and blended into the solid propellant during its processing at some point prior to extrusion. Then the mass is extruded, cut, and dried as usual. The resulting grains are ready for use as a propellant.

Typically, melamine perchlorate is prepared by suspending about 100 parts of melamine in about 400 parts water and about 113 parts of 70% perchloric acid, all parts by weight, is added drop-wise with agitation. The temperature of the resulting suspension is raised to about 90° C. which causes the melamine perchlorate to dissolve. Then the mixture is filtered hot and the melamine perchlorate remains in the filtrate where it crystallizes out on cooling. The crystals are then washed in cold water and dried. Melamine perchlorate made according to the foregoing yielded about 38 parts by weight, or about 85% of the theoretical yield.

Melamine perchlorate is characterized by a melting point of 295° C. and is stable to about 300° C. Analysis of a sample gave the following composition: C, 16.62%; H, 3.00%; N, 37.34%; Cl, 15.52%; O, remainder. The calculated composition is: C, 16.00%; H, 3.08%; N, 37.3%; Cl, 15.65%; O, remainder. Such data correspond to a compound having the following structural formula:

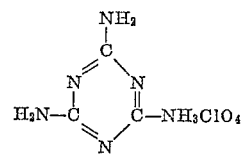

A propellant was prepared having the following composition: melamine perchlorate, 38%; nitrocellulose, 30%; nitroglycerin, 30%; and centralite, 2%. When strands of the propellant were compared to strands of a propellant in which the melamine perchlorate was replaced with nitroguanadine, the melamine perchlorate-containing strands burned faster, were more cohesive and gave less carbon deposits.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. As a new composition of matter, a propellant formulation consisting essentially of nitrocellulose, nitroglycerin, and melamine perchlorate.

2. As a new composition of matter, a propellant formulation consisting essentially of about 30% nitrocellulose, about 30% nitroglycerin, about 38% melamine perchlorate, and about 2% centralite.

References Cited in the file of this patent

UNITED STATES PATENTS

| | | |
|---|---|---|
| 792,511 | Frank | June 13, 1905 |
| 792,512 | Frank | June 13, 1905 |
| 2,392,607 | Nagy | Jan. 8, 1946 |
| 2,392,649 | D'Alelio | Jan. 8, 1946 |
| 2,425,854 | Alexander | Aug. 19, 1947 |
| 2,440,327 | Crawford | Apr. 27, 1948 |

OTHER REFERENCES

Rehnelt: Monatshefte für Chemi, vol. 84, pp. 257 to 262, 1953.

Vogel: A Textbook of Practical Organic Chemistry, Longmans, Green and Co., New York, 1948, pp. 122 to 126.

Chemical Abstracts, American Chemical Society, vol. 50, p. 6153.